United States Patent Office 3,177,634
Patented Apr. 13, 1965

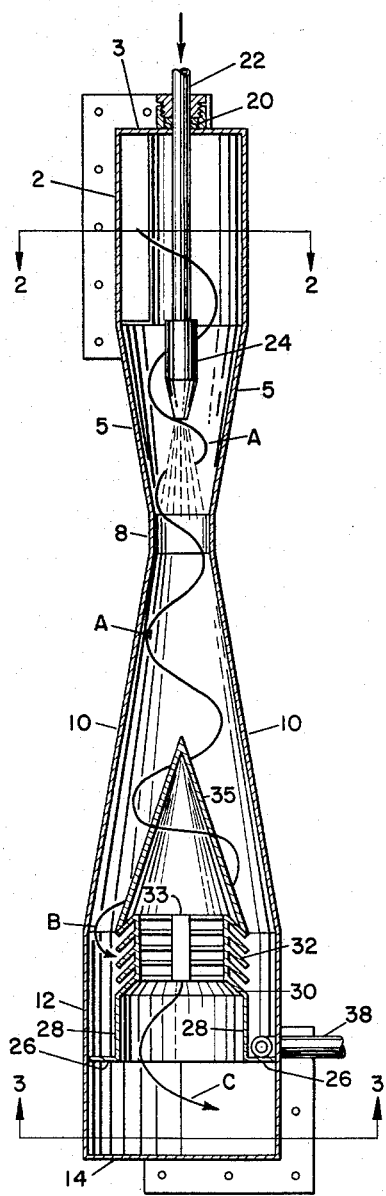
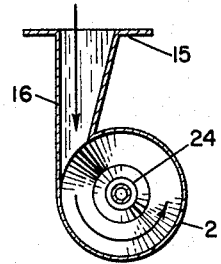
FIG. 2
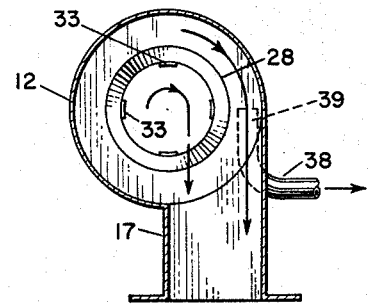
FIG. 3
FIG. 1
INVENTOR
BURTON F. LATHAM JR.
T. A. RUBLE

3,177,634
APPARATUS FOR THE RECOVERY OF
SOLIDS FROM GASES
Burton F. Latham, Jr., and Theodore A. Ruble, Houston, Tex., assignors to Continental Carbon Company, Houston, Tex., a corporation of Delaware
Filed May 21, 1962, Ser. No. 196,225
2 Claims. (Cl. 55—236)

This invention relates to the treatment of gases or aerosols, and more particularly to the recovery of solids which are suspended therein.

In the past there have been many proposals for removal or recovery of solids from various gases, a number of which involve the employment of a "cyclone," or centrifugal separator. Other proposals include the use of the so-called "Venturi-scrubber" which has been known for some time as an effective device for treating aerosols in order to facilitate wetting of the suspended particulates thereof. Its principle is to effect coalescence of the suspended particulate substances with droplets of a scrubbing liquid to develop particulate combinations which are capable of being readily separated by gravitational methods.

Other prior art developments include the connection of a Venturi-scrubber with a cyclone, or centrifugal separator; while another one was based on the concept of combining a Venturi-scrubber and a cyclone (or centrifugal separator) in a unitary structure. According to this last-mentioned development, the diameter of the Venturi of the scrubber was increased and a cylindrical sleeve was concentrically disposed in the main tubular housing of the Venturi-scrubber. In this manner, the same helical motion may primarily be used in the neck of the Venturi-scrubber to cause increased collision between water droplets and the suspended aerosol particles; and secondarily (in the cyclone, or centrifugal separator) to separate the water droplets that have trapped aerosol particles. In this manner, the wetting of the aerosol particles and the separation of the wetted particles are accomplished in one compact unit.

One disadvantage of a unit of the immediately aforementioned type is that a very narrow annular ring at the throat of the Venturi-scrubber must be completely covered with a liquid spray pattern in order to obtain maximum scrubbing action. In such an arrangement the complete and efficient coverage of the annular throat of the Venturi area by the atomizing sprays can prove difficult especially in small Venturi-scrubber units and in all cases a sizeable number of sprays must be utilized.

Among the objects of the present invention is to eliminate the problems of the prior art devices referred to hereinbefore.

Another object is to maintain the advantages of collecting water droplets and aerosol particles in the outlet section of a Venturi-scrubber without the use of an additional collecting cyclone.

Still another object is the attainment of the fore-going objectives in a relative simple and inexpensive manner.

The invention, then, comprises the features hereinafter fully described and as particularly pointed out in the claims, the following description and the annexed drawings setting forth in detail certain illustrative embodiments of the invention, these being indicative of some of possibly several ways in which the principles of the invention may be employed.

In said drawings:

FIGURE 1 is an elevational view, partly in section, and illustrating in vertical position, an apparatus which has been constructed in accordance with the teachings of the present invention, it being understood, however, that the apparatus is likewise susceptible of operation in a horizontal or substantially horizontal position;

FIGURE 2 is a sectional view taken on the line 2—2 of FIGURE 1; and

FIGURE 3 is a sectional view taken on the lines 3—3 of FIGURE 1.

Referring more particularly to the drawings, and especially to FIGURE 1, the housing of the apparatus is shown as comprising a tubular conduit in the aforementioned vertical position, said tubular conduit comprising a substantially cylindrical upper section 2 having a closed top 3.

Disposed below the upper cylindrical section 2, and in axial alignment therewith, is an inverted frusto-conical Venturi section 5, the lower end of which connects with a relatively short cylindrical section 8 which constitutes the neck of the Venturi; the latter, in turn, communicating with an elongate frusto-conical Venturi outlet or delivery section 10.

Disposed below and communicating with the elongate frusto-conical venturi outlet section 10 is a cylindrical outlet section 12 having a closed bottom 14.

Referring to the upper portion of FIGURE 1, the aerosol to be treated enters the apparatus through an aerosol feed pipe 15 which merges into a flattened section 16, the latter communicating directly with, and forming a tangential inlet for, the upper cylindrical section 2. As shown, the closure top 3 of the upper cylindrical section 2 is apertured and provided with a packing gland 20 through which there extends a pipe 22 for supplying water or other liquid with which the aerosol is to be treated. The lower end of this pipe 22 carries a spray nozzle 24, the lower end of the latter being shown as positioned proximate the transverse centerline of the inverted frusto-conical section 5. It will be understood, however, that the spray nozzle 24 and the pipe 22 by which it is carried may be adjusted into other positions.

Referring to the bottom of FIGURE 1, a ring 26 is positioned within the cylindrical outlet section 12 relatively adjacent its transverse centerline and supports an upwardly extending cylindrical sleeve 28. The upper end of this cylindrical sleeve 28 is provided with a frusto-conical portion 30 upon which there is superposed a series of frusto-conical louvers 32 of similar shape and size which are supported in position by louver brackets 33.

As will be noted the outside diameter of the series of frusto-conical louvers 32 is approximately the same as the outside diameter of the cylindrical sleeve 28.

Mounted atop the uppermost frusto-conical louver 32 is a deflector cone 35, the base of which is of approximately the same outside diameter as that of the cylindrical sleeve 28 and the said louvers.

Referring particularly to FIGURE 3, a slurry outlet tube 38 passes through a suitable opening in the side wall of the cylindrical sleeve 28 and is shown as provided with an extension 39 which is directed tangentially along the ring 26 with its open end facing the direction of movement of the aerosol which is indicated by the adjacently disposed arrow.

The slurry (i.e., fluid plus collected aerosol particles) leaving the cylindrical outlet section 12 through the slurry outlet pipe may, if desired, be passed through a sealpot (not shown) in order to prevent some of the effluent gas leaving the apparatus at this point.

*Operation*

The aerosol enters the tangential gas inlet 16 at the upper end of the apparatus where it increases in velocity due to its tapered or flattened construction. This high velocity stream of gas entering the upper cylindrical inlet section 7 tangentially produces a helical gas movement indicated at A which continues into the inverted frusto-conical Venturi inlet section 5 and throughout the remainder of the Venturi-scrubber. The scrubbing fluid (i.e. water or the like) is introduced through pipe 22 and spray nozzle 24 immediately ahead of the relatively short cylindrical (neck) section 8 of the Venturi-scrubber, the liquid spray eminating from the spray nozzle 24 or equivalent instrumentality. The helical gas movement A throws the spray droplets against the walls of the neck section of the Venturi (4) by centrifugal force, thus increasing the chances of collision between water droplets and the suspended aerosol particles. The helical gas flow expands through the elongate frusto-conical outlet section 10.

The deflector cone 35 separates this helical gas motion indicated at A into a hollow ring and helps to cause the fluid droplets containing the aerosol particles to be deflected against the wall of the cylindrical outlet section 12. The helical gas flow shown at B in the cylindrical outlet section 12 continues with a sudden reversal in direction through the frusto-conical outlet louvres 32. This reversal in spiral gas flow further acts to separate the aerosol containing fluid droplets from the gas stream. The clean gas stream C continues its helical motion through the inside of the louvre-supporting cylindrical sleeve 28 into the lower portion of the cylindrical outlet section 12 and leaves the Venturi-scrubber through the tangential gas outlet 17.

The slurry (fluid, plus collected aerosol particles) leave the scrubber through tangential slurry outlet tube 38 and its extensions 39. As previously mentioned, a seal-pot (not shown) can be provided on the lower end of the slurry outlet tube 38 to prevent some effluent gas from leaving through said outlet.

While we have shown and described certain specific embodiments of the present invention, it will be readily understood that we do not wish to be limited exactly thereto, since various modifications may be made without departing from the scope of the invention as defined in the appended claims.

We claim:

1. In an apparatus for washing gases, a tubular outer conduit; said tubular outer conduit successively comprising, and in communicating relationship, a cylindrical section for receiving the gas to be washed; a convergent frusto-conical section; a relatively short cylindrical Venturi section; an elongate divergent frusto-conical section; a third cylindrical section of approximately the same length as said first-named cylindrical section; a cone disposed in said divergent frusto-conical section; a cylindrical sleeve concentrically disposed in said third cylindrical section; a louvered body disposed between said cylindrical sleeve and the base of said cone; means for closing the space between the exterior of said cylindrical sleeve and the interior of said third cylindrical section; all of said aforementioned elements being in axial alignment; a tangentially disposed inlet for introducing the gas to be washed into said first-named cylindrical section, said tangentially disposed gas inlet being tapered; means in said convergent frusto-conical section for saturating the gas therein with liquid; means for removing liquid from between the interior of said third cylindrical section and the exterior of the cylindrical sleeve disposed therein; and a tangentially disposed outlet for removing from said third cylindrical section gas which passes through said louvered body and said cylindrical sleeve.

2. The apparatus of claim 1 wherein the means for saturating the gas is axially disposed with respect to said convergent frusto-conical section.

References Cited by the Examiner

UNITED STATES PATENTS

| | | | |
|---|---|---|---|
| 408,285 | 8/89 | Boehning | 55—442 |
| 890,537 | 6/08 | Stanley | 55—463 |
| 1,386,211 | 8/21 | Tompkins | 55—463 |
| 2,487,176 | 11/49 | Pitt et al. | 55—238 |
| 2,874,799 | 2/59 | Kolk | 55—460 |
| 2,976,949 | 3/61 | Murphy et al. | 55—238 |

FOREIGN PATENTS

| | | |
|---|---|---|
| 624,542 | 4/27 | France. |
| 487,672 | 6/38 | Great Britain. |
| 163,773 | 7/58 | Sweden. |

HARRY B. THORNTON, *Primary Examiner*.

HERBERT L. MARTIN, *Examiner*.